(12) United States Patent
Chaudhuri et al.

(10) Patent No.: US 9,609,660 B2
(45) Date of Patent: Mar. 28, 2017

(54) SYSTEM AND METHOD FOR ADAPTIVE DOWNLINK SCHEDULER FOR WIRELESS NETWORKS

(71) Applicants: Saptarshi Chaudhuri, Bangalore (IN); Irfan Baig, Bangalore (IN)

(72) Inventors: Saptarshi Chaudhuri, Bangalore (IN); Irfan Baig, Bangalore (IN)

(73) Assignee: Wipro Limited, Bangalore (IN)

( * ) Notice: Subject to any disclaimer, the term of this patent is extended or adjusted under 35 U.S.C. 154(b) by 90 days.

(21) Appl. No.: 14/644,594

(22) Filed: Mar. 11, 2015

(65) Prior Publication Data
US 2016/0183284 A1    Jun. 23, 2016

(30) Foreign Application Priority Data
Dec. 19, 2014   (IN) ............................ 6405/CHE/2014

(51) Int. Cl.
*H04L 12/24*    (2006.01)
*H04W 72/12*    (2009.01)
*H04W 24/10*    (2009.01)

(52) U.S. Cl.
CPC ....... *H04W 72/1242* (2013.01); *H04W 24/10* (2013.01); *H04W 72/1273* (2013.01)

(58) Field of Classification Search
CPC ............. H04W 72/1242; H04W 24/10; H04W 72/1273
See application file for complete search history.

(56) References Cited

U.S. PATENT DOCUMENTS

2004/0114583  A1*  6/2004  Cetin .................. H04L 12/5693
                                                         370/360
2004/0258070  A1   12/2004  Arima
                           (Continued)

FOREIGN PATENT DOCUMENTS

WO    WO 2005122497 A1    12/2005
WO    WO 2007133136 A1    11/2007
                           (Continued)

OTHER PUBLICATIONS

Priority-based-packet-scheduling-approach-forwireless-sensor-networks , Karthikeyan et al. Feb. 2014.*
(Continued)

*Primary Examiner* — Jay P Patel
(74) *Attorney, Agent, or Firm* — Finnegan, Henderson, Farabow, Garrett & Dunner, LLP

(57) ABSTRACT

The present disclosure relates to systems, methods, and non-transitory computer-readable media for efficient scheduling of downlink data traffic at a base station. The method may comprise: receiving one or more downlink data packets from a second protocol layer. Thereafter, the one or more downlink packets may be classified into one or more categories of packets based on transmission type and radio transmission state of the one or more downlink packets. Further, one or more first packets from each of the one or more categories of packets may be scheduled based on a pre-determined priority order of the one or more categories of packets and a predetermined packet transmission share associated with each of the one or more categories of packets. Finally, the one or more first packets are transmitted from the one or more categories of packets in a transmission time interval.

19 Claims, 11 Drawing Sheets

(56) References Cited

U.S. PATENT DOCUMENTS

| | | | |
|---|---|---|---|
| 2005/0249117 A1* | 11/2005 | Gerkins | H04L 47/6215 370/230 |
| 2007/0280260 A1 | 12/2007 | Ryu et al. | |
| 2008/0020775 A1* | 1/2008 | Willars | H04L 47/10 455/445 |
| 2009/0135721 A1* | 5/2009 | Karlsson | H04W 72/10 370/235 |
| 2009/0203385 A1* | 8/2009 | Khandekar | H04W 16/10 455/452.1 |
| 2010/0232371 A1* | 9/2010 | Jing | H04L 12/5693 370/329 |
| 2010/0279679 A1* | 11/2010 | Young | H04W 36/0083 455/423 |
| 2011/0268119 A1* | 11/2011 | Pong | H04L 47/32 370/392 |
| 2012/0008499 A1* | 1/2012 | Stanwood | H04L 47/623 370/235 |
| 2012/0030451 A1* | 2/2012 | Pong | H03M 13/09 712/223 |
| 2012/0140633 A1* | 6/2012 | Stanwood | H04L 47/2458 370/235 |
| 2012/0182859 A1* | 7/2012 | Ikeda | H04L 1/1835 370/216 |
| 2012/0281536 A1* | 11/2012 | Gell | H04W 28/06 370/235 |
| 2012/0320745 A1 | 12/2012 | Shi | |
| 2012/0327778 A1* | 12/2012 | Stanwood | H04W 72/1242 370/237 |
| 2012/0327779 A1* | 12/2012 | Gell | H04L 47/6275 370/238 |
| 2013/0051326 A1* | 2/2013 | Jeyatharan | H04L 47/245 370/328 |
| 2013/0294371 A1 | 11/2013 | Ishii et al. | |

FOREIGN PATENT DOCUMENTS

| | | |
|---|---|---|
| WO | WO 2012116755 A1 | 9/2012 |
| WO | WO 2012162898 A1 | 12/2012 |

OTHER PUBLICATIONS

3GPP TS 23.401 V8.16.0 (Mar. 2012) Release 8; $3^{rd}$ Generation Partnership Project; Technical Specification Group Services and System Aspects; General Packet Radio Service (GPRS) enhancements for Evolved Universal Terrestrial Radio Access Network (pp. 1-238).

3GPP TS 36.211 V10.7.0 (Feb. 2013) Release 10; $3^{rd}$ Generation Partnership Project; Technical Specification Group Radio Access Network; Evolved Universal Terrestrial Radio Access (E-UTRA); Physical Channels and Modulation (pp. 1-101).

3GPP TS 36.212 V10.8.0 (Jun. 2013) Release 10; $3^{rd}$ Generation Partnership Project; Technical Specification Group Radio Access Network; Evolved Universal Terrestrial Radio Access (E-UTRA); Multiplexing and channel coding (pp. 1-79).

3GPP TS 36.300 V10.11.0 (Sep. 2013) Release 10; $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (pp. 1-195).

3GPP TS 36.213 V10.12.0 (Mar. 2014) Release 10; $3^{rd}$ Generation Partnership Project; Technical Specification Group Radio Access Network; Evolved Universal Terrestrial Radio Access (E-UTRA); Physical layer procedures (pp. 1-127).

3GPP TS 36.321 V8.12.0 (Mar. 2012) Release 8; 3rd Generation Partnership Project; Technical Specification Group Radio Access Network; Evolved Universal Terrestrial Radio Access (E-UTRA); Medium Access Control (MAC) protocol specification (pp. 1-47).

3GPP TS 36.331 V8.17.0 (Jun. 2012) Release 8; 3rd Generation Partnership Project; Technical Specification Group Radio Access Network; Evolved Universal Terrestrial Radio Access (E-UTRA); Radio Resource Control (RRC); Protocol specification (pp. 1-215).

Extended European Search Report pursuant to Rule 62 EPC, the European Search Report (R. 61 EPC) or the partial European Search Report/Declaration of no search (R. 63 EPC) and the European Search Opinion issued in the related European Application No. 15160423.8—1857; mailed Apr. 18, 2016 (8 pgs.).

* cited by examiner

700

702 — Receive one or more data packets from RLC layer

704 — Classify the packets and place the packets in different bins based on the classification 706 — Fetch the packets from the control-NewTx and the control-ReTx bins as per the Packet Transmitted per Bin for the control-NewTx and the control-ReTx bins and add to the scheduling list

FIG. 7

SYSTEM AND METHOD FOR ADAPTIVE DOWNLINK SCHEDULER FOR WIRELESS NETWORKS

PRIORITY CLAIM

This U.S. patent application claims priority under 35 U.S.C. §119 to: India Application No. 6405/CHE/2014, filed on Dec. 19, 2014. The entire contents of the aforementioned application are incorporated herein by reference.

DESCRIPTION

Technical Field

The present disclosure relates generally to wireless communication networks, and more particularly but not limited to adaptive scheduling of heterogeneous packets across a downlink communication channel in the wireless communication networks.

Background

In present day scenario, rapid increase in mobile subscriber base and recent emergence of applications such as MMOG (multimedia online gaming), mobile TV, web 2.0, high definition video streaming, live meeting etc., have resulted in large scale increase of mobile data usage. Typically, a base station has a limited cell bandwidth of 1.4 to 20 MHz. As a result, users will be faced with service refusal, degradation in quality of service. Also, performance of the base station may be degraded due to increased handover delays, underutilization of radio resources etc.

For example LTE (long term evolution) network tries to address the above issues, by providing high sector capacity through a frequency reuse factor of 1, improve end-user throughputs by providing faster download and upload rates, scalability and reduced user plane latency through simplified architecture and bringing significantly improved user experience with full mobility.

In a LTE network, the backhaul connectivity between the base station (referred to as evolved node B eNodeB or eNB) and core network will be completely packet-switched network (all Internet Protocol based). A packet-switched network imposes challenges on eNB to achieve overall network performance and efficient resource utilization because of inherent issue of non-guaranteed packet arrival rate in the core network. Thus it leads to the fact that, high network bandwidth do not always conclude in better network performance.

The LTE has simplified base station or eNB architecture with each layer in the protocol stack playing a vital role. The network architecture of the eNB comprises a packet data convergence protocol (PDCP) layer, a radio link control (RLC) layer, and a medium access control (MAC) layer. Downlink scheduling of the data packets is the main functionality of the MAC layer. However, due to uncertainty in wireless channel conditions, huge traffic load, and uneven packet arrival pattern, the performance of the MAC layer in providing downlink scheduling in a high speed wireless communication network is greatly hampered.

In view of the above drawbacks, there is a need for an improved downlink scheduler that can improve performance of the high speed wireless communication network.

SUMMARY

Disclosed herein is a method for efficient scheduling of downlink data traffic at a base station. The method may include receiving, at a first protocol layer, one or more downlink data packets from a second protocol layer; classifying the one or more downlink packets into one or more categories of packets based on transmission type and radio transmission state of the one or more downlink packets; scheduling one or more first packets from each of the one or more categories of packets based on a pre-determined priority order of the one or more categories of packets and a predetermined packet transmission share associated with each of the one or more categories of packets; transmitting the one or more first packets from the one or more categories of packets in a transmission time interval; updating a pre-determined priority order of the one or more categories of packets and a pre-determined packet transmission share associated with each of the one or more categories of packets after a predetermined time interval; and scheduling one or more second packets from the one or more categories of packets based on the updated pre-determined priority order of the one or more categories of packets and a predetermined packet transmission share associated with each of the one or more categories of packets in the transmission time interval subsequent to the updating.

In an aspect of the invention, a system for efficient scheduling of downlink data traffic at a base station is disclosed. The system may include one or more hardware processors; and a memory storing instructions that, when executed by the one or more hardware processors, cause the one or more hardware processors to perform operations. The operations may include receiving, at a first protocol layer, one or more downlink data packets from a second protocol layer; classifying the one or more downlink packets into one or more categories of packets based on transmission type and radio transmission state of the one or more downlink packets; scheduling one or more first packets from each of the one or more categories of packets based on a pre-determined priority order of the one or more categories of packets and a predetermined packet transmission share associated with each of the one or more categories of packets; transmitting the one or more first packets from the one or more categories of packets in a transmission time interval; updating a pre-determined priority order of the one or more categories of packets and a pre-determined packet transmission share associated with each of the one or more categories of packets after a predetermined time interval; and scheduling one or more second packets from the one or more categories of packets based on the updated pre-determined priority order of the one or more categories of packets and a predetermined packet transmission share associated with each of the one or more categories of packets in the transmission time interval subsequent to the updating.

In another aspect of the invention, a non-transitory computer readable medium storing instructions for efficient scheduling of downlink data traffic at a base station is disclosed. The instructions when executed by a processor cause the processor to perform operations. The operations may include receiving, at a first protocol layer, one or more downlink data packets from a second protocol layer; classifying the one or more downlink packets into one or more categories of packets based on transmission type and radio transmission state of the one or more downlink packets; scheduling one or more first packets from each of the one or more categories of packets based on a pre-determined priority order of the one or more categories of packets and a predetermined packet transmission share associated with each of the one or more categories of packets; transmitting the one or more first packets from the one or more categories of packets in a transmission time interval; updating a pre-determined priority order of the one or more categories of packets and a pre-determined packet transmission share associated with each of the one or more categories of packets after a predetermined time interval; and scheduling one or more second packets from the one or more categories of packets based on the updated pre-determined priority order of the one or more categories of packets and a predetermined packet transmission share associated with each of the one or more categories of packets in the transmission time interval subsequent to the updating.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings:

FIG. 7 is a flowchart of an exemplary method of scheduling of the downlink packets obtained from the control-NewTx and control-ReTx bins in accordance with some embodiments of the present disclosure;

DETAILED DESCRIPTION

As used herein, reference to an element by the indefinite article "a" or "an" does not exclude the possibility that more than one of the element is present, unless the context requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

The present disclosure discloses an improved eNB enabled with an adaptive downlink scheduler. The adaptive downlink scheduler may be used for scheduling data packets across a shared downlink communication channel from eNB to mobile stations/user equipment in a wireless broadband network. The scheduling results in effective scheduling of traffic in a dynamic load scenario, to achieve optimal network performance, efficient resource utilization and increased cell throughput. The adaptive downlink scheduler is able to perform differential scheduling based on radio transmission-state and selective scheduling based on transmission type using the following mechanism:

1. Packet classification based on the transmission type (GBR, Non-GBR, and Control) and Radio transmission-state (New-Transmission, Re-transmission) into separate "Bin(s)"
2. Scheduling metric determination for certain categories of packets, i.e. GBR, Non-GBR packets.
3. Dynamic packet selection based on pre-determined priority-order and packet-transmission-quota
4. Adaptation of priority-order and packet-transmission quota based on performance parameters of the adaptive downlink scheduler.

Figure 1:
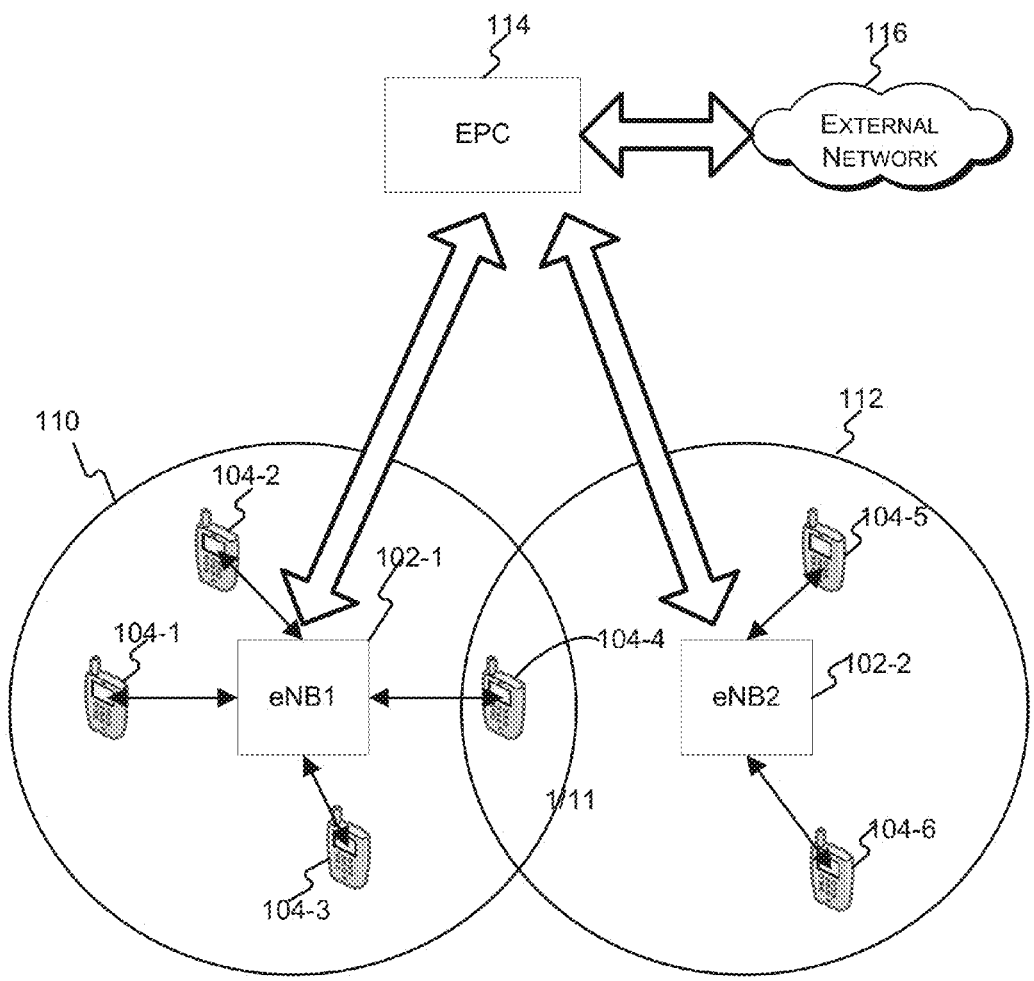
FIG. 1 illustrates an exemplary wireless communication system incorporating an evolved nodeB (eNB) for implementing methods consistent with the present disclosure.

FIG. 1 illustrates an exemplary wireless communication system 100 incorporating an evolved nodeB (eNB) for implementing methods consistent with the present disclosure. The wireless communication system 100 shown in FIG. 1 may include one or more base stations 102-1, 102-2 (collectively referred to as 102). In the example of FIG. 1, the one or more base stations 102-1, 102-2 are shown as evolved NodeBs. Base station is a node that can relay signals for mobile devices/user equipments, UE1 104-1, UE2 104-2, UE3 104-3, UE4 104-4, UE5 104-5, and UE6 104-6 (collectively referred to as UE 104). The term "base station" (BS) can be interchangeably used with a network node, an access node, or a network component.

The exemplary wireless communication system 100 may include a first radio access network 110/first cell and a second radio access networks/second cell 112, evolved packet core (EPC) networks 114, and external networks 116 (internet). In certain implementations, the first radio access network 110 may be a Long-Term Evolution (LTE) wireless communication network. The second radio access network 112 may be WLAN networks that may include IEEE802.11 WLAN, IEEE802.16 WiMAX network, etc. Further, as shown, the UE4 104-4 operates within the overlapping region of the first radio access network 110 and the second radio access network 112 and served by both the networks. In some implementations, 2G/3G systems, Global System for Mobile Communication (GSM), Interim Standard 95 (IS-95), Universal Mobile Telecommunications systems (UMTS) and/or Code Division Multiple Access (CDMA2000) may also be integrated into the first radio access network 110.

Further, the first cell 110 may be service area of the eNB 102-1 and the second cell 112 may be the service area of the eNB 102-2. The first cell 110 and the second cell 112 may overlap. The eNB 102 may include a processing module. The processing module may include one or more processing components (alternatively referred to as "processors" or "central processing units" (CPUs)) operable to execute instructions related to one or more of the processes, steps, or actions described in connection with one or more of the embodiments disclosed herein. The processing module may include other auxiliary components, such as random access memory (RAM), read only memory (ROM), secondary storage (for example, a hard disk drive or flash memory). Additionally, the processing module may execute certain instructions and commands to provide wireless or wired communication, using a wired communication subsystem or a wireless communication subsystem of the eNB.

The UE 104 may be any wireless electronic device used by an end-user to communicate, for example, within the wireless communication system 100. The UE 104 may transmit voice, video, multimedia, text, web content and/or any other user/client-specific content. The transmission of some contents, e.g., video and web content, may require high channel throughput to satisfy the end-user demand. The UE 104 may generate requests, send responses or otherwise communicate in different means with Evolved Packet Core (EPC) 114 and/or external networks/Internet Protocol (IP) networks 116 through the eNBs 102. Examples of UE 104 include, but are not limited to, a mobile phone, a smart phone, a telephone, a television, a remote controller, a set-top box, a computer monitor, a computer (including a tablet computer, a desktop computer, a handheld or laptop computer, a netbook computer), a personal digital assistant (PDA), etc.

The EPC may include one or more mobility management entities (MME)/a serving gateways (SGW) (not shown), and a packet data network gateway (PGW) (not shown). The PGW may provide connectivity to the services domain comprising external networks 116, such as the IP networks.

Figure 2:
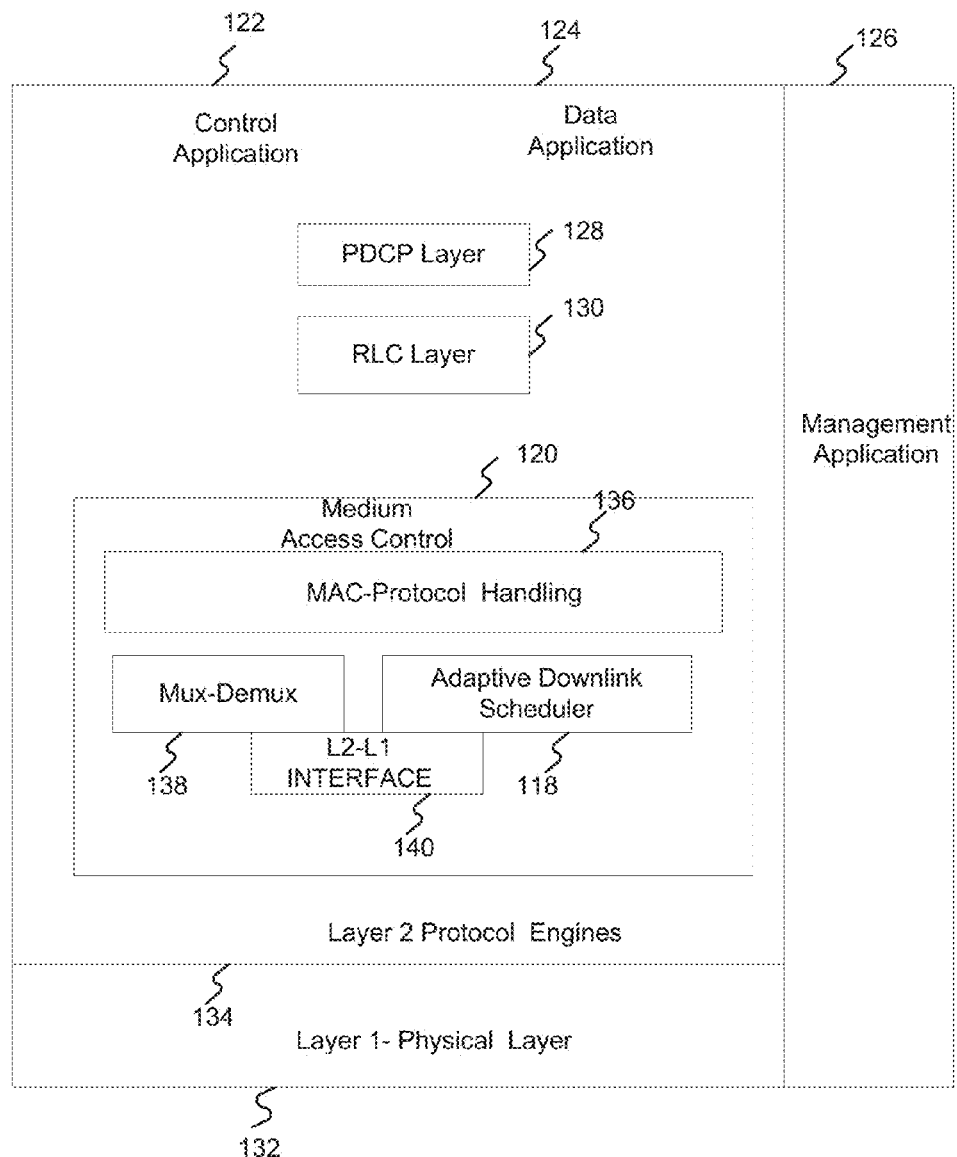
FIG. 2 illustrates exemplary architecture of improved eNB incorporating an adaptive downlink scheduler in medium access control (MAC) layer in accordance with some embodiments of the present disclosure.

FIG. 2 illustrates exemplary architecture of improved eNB 102 incorporating an adaptive downlink scheduler 118 in the medium access control (MAC) layer 120 in accordance with some embodiments of the present disclosure. Shown in FIG. 2 are a control application 122, a data application 124, a management application 126, the PDCP layer 128, RLC layer 130, and the MAC layer 120, layer 1-physical layer 132, layer 2 protocol engines 134. The MAC layer 120 further comprises MAC-protocol handling 136, Mux-Demux 138, and L2-L1 interface 140. The adaptive downlink scheduler 118 may predominantly interact with the layer 1-physical layer 132, layer 2 protocol engines 134.

Figure 3:
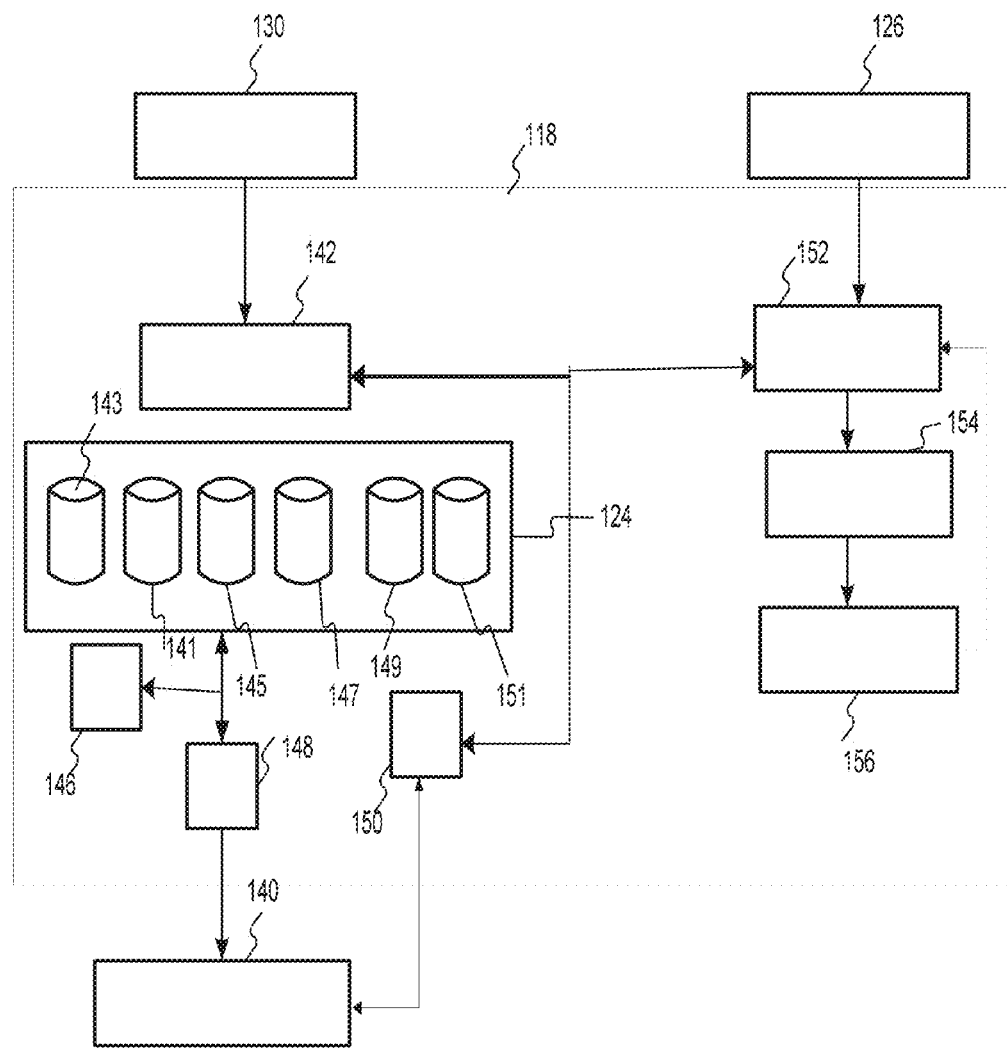
FIG. 3 is a block diagram of an exemplary adaptive downlink scheduler in accordance with some embodiments of the present disclosure.

FIG. 3 is a block diagram of an exemplary adaptive downlink scheduler 118 in accordance with some embodiments of the present disclosure. The adaptive downlink scheduler 118 may comprise a packet classification module (PCM) 142, a bin management module (BMM) 144, a scheduling metric calculation module (SMCM) 146, a packet selection module (PSM) 148, a performance monitoring module (PMM) 150, a scheduler configuration module (SCM) 152, a trigger auto-tuning module 154, an autotune module (ATM) 156. The modules are described in detail as follows:

Scheduler Configuration Module (SCM) 152.

The scheduler configuration module 152 may be responsible for storing the environment (e.g., No. of bins and type of bins) and configuration parameters (static and dynamic) required by all other modules of the adaptive downlink scheduler (ADS) 118.

During initialization of the ADS 118, the ADS 118 may obtain following configuration parameters from the management application 126. This list of configuration parameters is meant to be illustrative only and not exhaustive.

Packet Classification

For e.g.,
  a. Transmission type (GBR, Non-GBR, and Control),
  b. Radio transmission-state (New-Transmission, Re-transmission)

The above parameters may be used by the packet classification module (PCM) 142.

Number of Bins Containing Different Categories of Data Packets

For e.g., six transmission bins

The above parameter may be used by the bin management module (BMM) 144.

Types of Bins

For e.g.,
  a. Control Traffic ReTx bin 141
  b. Control traffic NewTx bin 143
  c. GBR-ReTx bin 145
  d. GBR-NewTx bin 147
  e. Non-GBR-ReTx bin 149
  f. Non-GBR-NewTx bin 151

This parameter may be used by the bin management module 144.

Priority Order of Each Bin

For e.g. the BMM 144 may configure the priority order as given below.
  Control traffic ReTx bin>Control traffic NewTx bin>GBR-ReTx bin>GBR-NewTx bin>Non-GBR-ReTx bin>Non-GBR NewTx bin This parameter may be used by the bin management module 144.

Packet Transmitted Per Bin:

This defines the number of packets to be transmitted from each bin within a single system time interval which is given below:
  a. MAX NUMBER OF CONTROL-RETX PACKETS $\phi_{MAX}$
  b. MAX NUMBER OF CONTROL-NEWTX PACKETS $\omega_{MAX}$
  c. MAX NUMBER OF GBR-RETX PACKETS $\phi_{MAX}$
  d. MAX NUMBER OF GBR-NEWTX PACKETS $\chi_{MAX}$
  e. MAX NUMBER OF NON-GBR-RETX PACKETS $\psi_{MAX}$
  f. MAX NUMBER OF NON-GBR-NEWTX PACKETS $\delta_{MAX}$ If $\bar{\omega}_{MAX}$ is the maximum number of packets which can be transmitted in a system time interval, such that $$\bar{\omega}_{MAX} = \phi_{MAX} + \omega_{MAX} + \phi_{MAX} + \chi_{MAX} + \psi_{MAX} + \delta_{MAX}$$

This parameter may be used by the packet selection module 148

Number of Packet Queued Threshold Per Bin ($N_{bin-TH}$):

This parameter defines the maximum number of packets that can be queued per Bin.

This parameter may be used by the ATM 156.

Average Inter Scheduling Delay Threshold Per Bin ($\Omega_{bin\text{-}TH}$):
This parameters defines the maximum average inter scheduling delay per Bin.
This parameter may be used by the ATM 156.

Delta Packet Transmitted Per Bin ($\Delta_{bin}$):
This parameter defines the increment or decrement the packet transmitted per bin.
This parameter will be used by the ATM 156.

Bin Onset Time Update Time Interval (BOT-Update-Interval):
This parameter defines the interval at which the BMM 144 may trigger to update the bin onset time (BOT).
This parameter may be used by the BMM 144.

Scheduling Metric Calculation Periodicity for Each Bin.
This variable defines the frequency at which scheduling metric should be computed for a bin.
 a. GBR-NewTx bin—$\alpha_{GN\text{-}bin}$
 b. Non-GBR-NewTx bin—$\alpha_{NGN\text{-}bin}$
This parameter may be used by scheduling metric calculation module 146.

Maximum Bit Rate (MaxBR$_{QCI}$):
Maximum Bit Rate of application type represented by each packet. The application type is a 3GPP specification defined parameter represented as QoS Classification Indicator (QCI).
This parameter may be used by scheduling metric calculation module 146.

Maximum Packet Delay Budget ($\lambda_{QCI}$):
The maximum packet delay budget of each of application type represented by each packet which is a 3GPP specification defined parameter.
This parameter may be used by scheduling metric calculation module 146.

GBR-ReTx Bin Hold Off Timer Threshold ($\beta_{GR\text{-}HOT\text{-}th}$):
This parameter defines the threshold for maximum hold off time for a GBR-ReTx packet.
 This parameter may be used by the SMCM 146.
Non-GBR-ReTx Bin Hold Off Timer Threshold ($\beta_{NGR\text{-}HOT\text{-}th}$):
This parameter defines the threshold for maximum hold off time for a Non-GBR-ReTx packet.
 This parameter may be used by the SMCM 146.
GBR-ReTx Bin Max Retx Count ($\gamma_{GR\text{-}MaxReTx}$):
This parameter defines the threshold for maximum number of retransmissions for a GBR-ReTx packet.
This parameter shall be used by the SMCM 146.
Non-GBR-ReTx Bin Max Retx Count ($\gamma_{NGR\text{-}MaxReTx}$):
This parameter defines the threshold for maximum Retransmissions for a Non-GBR-ReTx packet.
This parameter shall be used by the SMCM 146.

Auto-Tuning Periodicity ($T_{Auto\text{-}tuning}$):
This parameter defines the interval at which the Auto-tuning function should trigger.
This parameter may be used by the auto-tune module 156.

Scheduling List ($\mu_{LIST}$):
Defines a list to hold a user which got scheduled in a system time interval and it is initialized with NULL.
 This parameter may be used by the PCM 148.

Packet Classification Module (PCM) 142
The PCM 142 may be responsible for dynamic classification of packets. The PCM 142 may dynamically classify the packets coming from the RLC layer 130 based on the packet classification criteria transmission type (GBR, Non-GBR, and Control), radio transmission-state (New-Transmission, Re-transmission)) as given by the SCM. The PCM 142 may assign a label to the classified packet and forwards it to the BMM 144.

Bin Management Module (BMM) 144
The BMM 144 may be responsible for management of the bins. The BMM may obtain the bin information (e.g. Number of bins and Type of bins) from the SCM 152 and creates physical bins (Queues, linked lists, etc.). The bins may comprise control traffic—new Tx bin The BMM 144 may receive the packets from the PCM 142, based on the label assigned to each packet, identifies the bins to which the packet belongs and pushes the packets into the respective bins. The BMM 144 adds two tags to each of the packet. The first tag is called bin-onset-time and the second tag is called packet arrival time. As the BMM 144 puts the packet to the physical bin, it may initialize the packet arrival time to the system time value. The BMM 144 may also maintains statistics for the bins (e.g., Replenishment rate of each bin, number of packets in the bin.). For the certain bins like Control-NewTx and Control-ReTx, the bin may be sorted in descending order of Bin-onset-time. The BMM 144 may also track the number of packets per Bin.

Scheduling Metric Calculation Module (SMCM) 146
The SMCM 146 may dynamically calculate a distinct scheduling metric for certain categories of packets. These categories of packets may be guaranteed bit rate-new GBR-NewTx packets and Non-GBR-ReTx packets. The SMCM 146 may obtain configuration parameters (e.g. scheduling metric calculation periodicity, Maximum Bitrate and Maximum Packet delay budget) from the SCM 152. The SMCM 146 may also obtain performance values (Average Bit rate, HOL delay and inter-scheduling interval) from the PMM 150. The SMCM 146 may obtain the run time packet information (Packet service type (QCI)) from the BMM 144 and may calculate the scheduling metric for the GBR-NewTx packets and Non-GBR-ReTx packets across the respective bins.

Packet Selection Module (PSM)
The PSM 148 may dynamically select the packets across the bins for transmission. The PSM 148 may obtain the configuration parameters (e.g. Priority order and Packet Transmission share per bin) from the SCM 152. The PSM 148 may obtain the scheduling metric values from SMCM 146. The PSM 148 may then selects the packets for transmission. The selected packets are forwarded to medium access control (MAC)'s L2-L1 interface 140 for transmission to the UEs 104.

Performance Monitoring Module (PMM)
The PMM 150 may dynamically monitor the adaptive downlink scheduler 118 performance. The PMM 150 may obtain the transmission status (ACK/NACK, Number of Transmission bits, etc.) from the MAC layer's L2-L1 interface, calculates the adaptive downlink scheduler 118 performance (throughputs and delays). The PMM 150 may map the transmission status i.e. ACK/NACK to radio transmission state. The ACK will be mapped to new transmission packet, and NACK will be mapped to Re-transmission packet. Once the mapping is complete, the PMM 150 may share the radio transmission to the PCM 142.

Trigger Auto-Tune Module (TAM) 154
The TAM 154 may dynamically monitor the trigger for Auto-tuning. The TAM 154 may obtain the configuration parameters (e.g. Auto tuning periodicity) from the SCM 152 and after every "Auto-tuning periodicity" time, the TAM module 154 may send a trigger message to the ATM 156.

Auto-Tuning Module (ATM)
The ATM 156 may periodically auto tunes some of the scheduler configuration parameters based on the inputs from the PMM 150 and BMM 144. The ATM 156 may read the specific scheduler configuration parameters (e.g. Transmission Share, Priority order) from the SCM 152, auto-tunes the configuration parameters by considering performance parameters from the PMM 150 and BMM 144 and writes back the auto-tuned parameters to the SCM 152.

Figure 4:
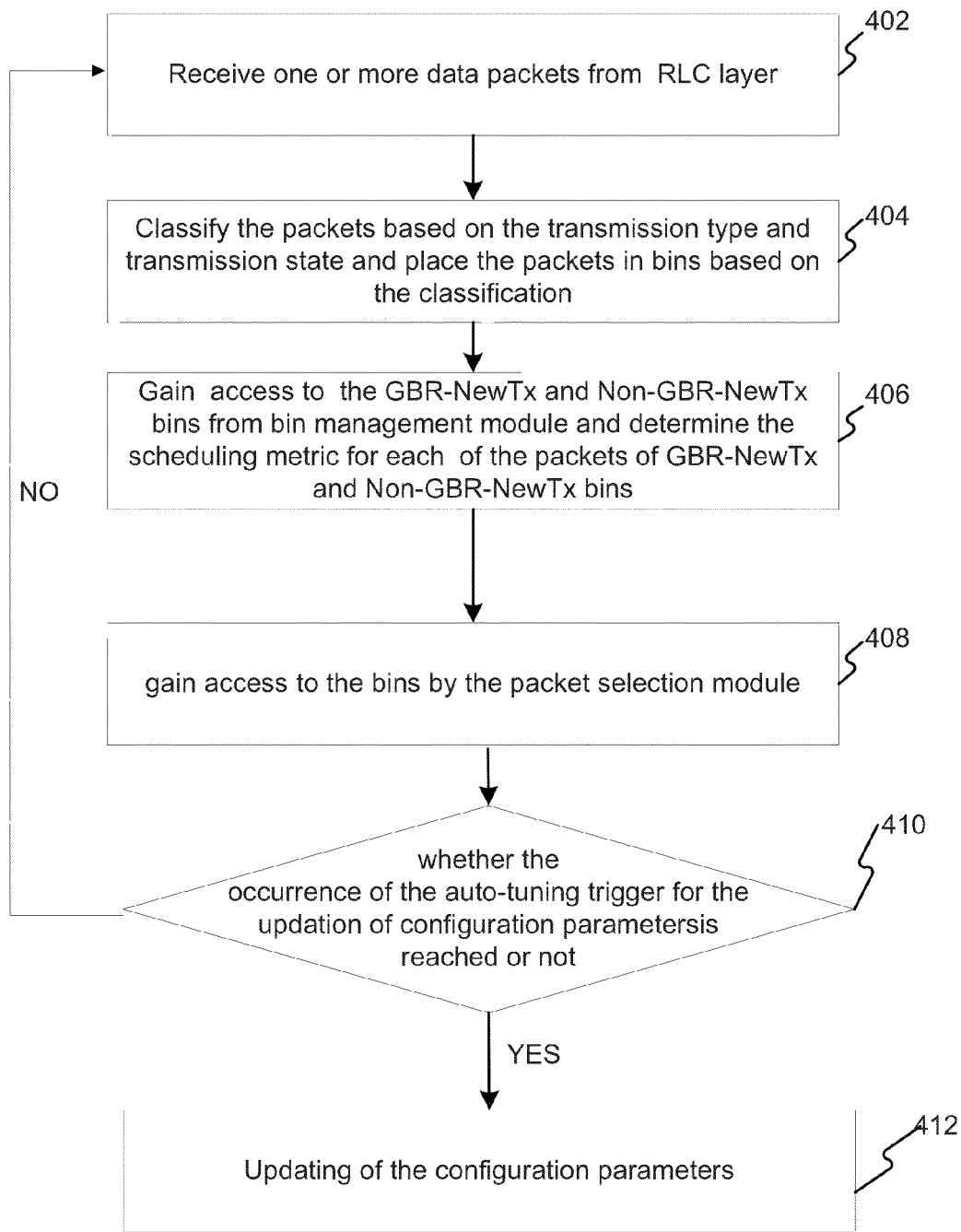
FIG. 4 is a flowchart of an exemplary method of scheduling of the downlink packets from the eNB to user equipment UE in accordance with some embodiment of the present disclosure.

FIG. 4 is a flowchart 400 of an exemplary method of scheduling of the downlink packets from the eNB 102 to UE 104 in accordance with some embodiment of the present disclosure. At step 402, receive one or more data packets. The PCM 142 may receive the one or more data packets form the RLC layer 130 either through a communication interface or in-memory data sharing.

At step 404, classify the packets. The PCM 142 may identify the transmission type of the received packet, as one of Control packet, GBR Packet, Non-GBR packet, etc. based on the radio-bearer-id in the received packet. The PCM 142 may then identify the radio transmission state of the packet, as one of New Transmission packet, Re-Transmission packet, etc. from the HARQ (Hybrid Automatic Repeat Request) state of the packet. The PCM 142 may generate a label from the determined transmission type and radio transmission state. For example, a label may be generated by combining the values of the transmission type and radio transmission state in the form of a concatenated string. For example, if transmission type is GBR Packet and radio transmission state is New Transmission packet then the label will be 'GBR-NewTx'. The PCM 142 may assign the generated label to the received packets to classify it by setting the value of the field 'Label' in the packet. The PCM 142 may forward the labeled packet to the BMM either through an interface or in-memory data sharing. The BMM 144 may receive the labeled-packet and stores packet-arrival-time as the current system time-stamp and set the bin-onset-time value to zero to the labeled packet. The BMM 144 may then place the labeled packet in the respective bin by matching the Bin ID with the packet label.

At step 406, the SMCM 146 may gain access to the GBR-NewTx and Non-GBR-NewTx bins from the BMM 144. The SMCM 146 may then determine the scheduling metric for each of the packets of GBR-NewTx and Non-GBR-NewTx bins.

At step 408, the PSM 148 may gain access to the bins from the BMM 144. The PSM 148 may obtain the priority order of and transmission share of packets for each of the bins for packet selection from the SCM 152. The PSM 148 may then choose bins in the obtained priority order and then chooses the packets from each bin as per the transmission share of each of the bins by following a series of steps. The chosen packets may be forwarded to the MAC layer 120 for being transmitted across the downlink communication channel to the UE 104.

At step 410, a decision is taken as to whether the occurrence of the auto-tuning trigger for the updating of the configuration parameters (i.e. packet transmitted per bin, priority order) is reached or not. If the answer is yes, the method goes to step 412, where the ATM 156 reads the current scheduler configuration parameters (i.e. packet transmitted per bin, priority order) from SCM 152 and update the configuration parameters, i.e. packets transmitted per bin, priority order of the bins and writes back the updated configuration parameters from the SCM 152. If the answer is no, the method goes to step 402.

FIGS. 5-9 illustrate flowcharts of exemplary methods of scheduling of the downlink packets obtained from different types of bins, i.e.

a. Control Traffic ReTx bin 141
b. Control traffic NewTx bin 143
c. GBR-ReTx bin 145
d. GBR-NewTx bin 147
e. Non-GBR-ReTx bin 149
f. Non-GBR-NewTx bin 151

FIGS. 5-9 will now be explained in conjunction with FIG. 3 that illustrates the block diagram of the adaptive downlink scheduler 118.

Figure 5:
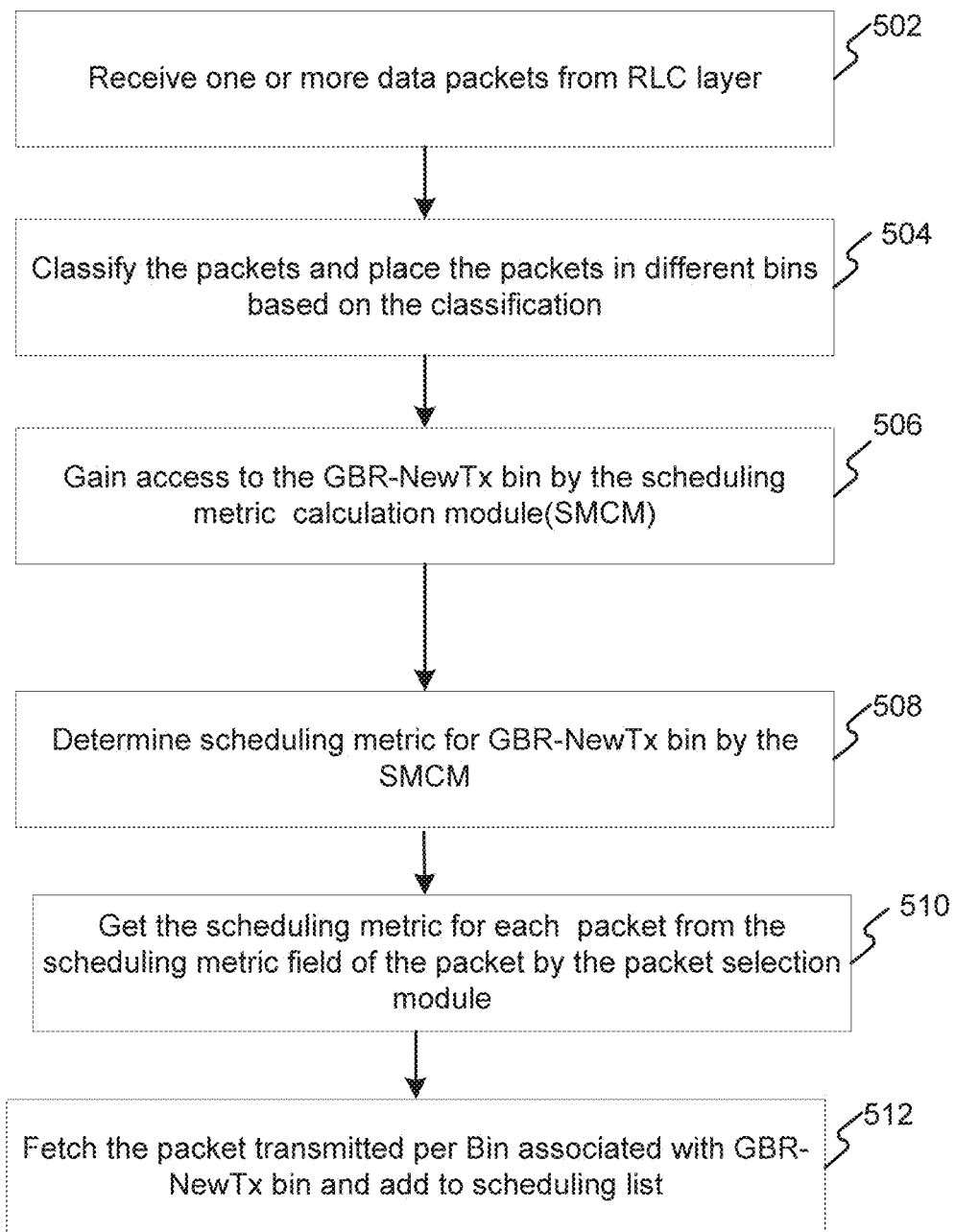
FIG. 5 is a flowchart of an exemplary method of scheduling of the downlink packets obtained from GBR-NewTx bin in accordance with some embodiments of the present disclosure.

FIG. 5 is a flowchart 500 of an exemplary method of scheduling of the downlink packets obtained from the GBR-NewTx bin 147 in accordance with some embodiments of the present disclosure. At step 502, receive one or more data packets. The PCM 142 may receive the one or more data packets form the RLC layer 130 either through a communication interface or in-memory data sharing.

At step 504, classify the packets and place the packets in different bins based on the classification. The PCM 142 may identify the transmission type of the received packet, as one of Control packet, GBR Packet, Non-GBR packet, etc. based on the radio-bearer-id in the received packet. The PCM 142 may then identify the radio transmission state of the packet, as one of New Transmission packet, Re-Transmission packet, etc. from the HARQ (Hybrid Automatic Repeat Request) state of the packet. For example, if transmission type is GBR Packet and radio transmission state is New Transmission packet then the label will be 'GBR-NewTx'. The PCM 142 may assign the generated label to the received packets to classify it by setting the value of the field 'Label' in the packet. The PCM 142 may forward the labeled packet to the BMM either through an interface or in-memory data sharing. The BMM 144 may receive the labeled-packet and stores packet-arrival-time as the current system time-stamp and set the bin-onset-time value to zero to the labeled packet. The BMM 144 may then place the labeled packet in the respective bin by matching the Bin ID with the packet label.

At step 506, the SMCM 146 may gain access to the GBR-NewTx bin 147 from the BMM 144. At step 508, the SMCM 146 may then determine scheduling metric for GBR-NewTx bin 147 using the following steps for the bin. If GBR-NewTx Bin 147?

a. The SMCM may check if the scheduling metric calculation periodicity for this bin is reached, i.e., if System–time % $\alpha_{GN\text{-}bin}$==0
If true then SMCM goes to the next step else it returns, wherein system-time is the current system time stamp obtained from MAC's L2-L1 interface 140.

b. The SMCM may then calculate the scheduling metric for all the packets in the bin, in top to bottom order, using the following steps, 1) The SMCM 146 may determine the QCI of the packet from the QCI field of the packet.
2) The SMCM 146 may obtain the values of $MaxBR_{QCI}$, $\lambda_{QCI}$ for the determined QCI from the SCM 152.
3) The SMCM 146 then gets the following values from the PMM 150,
i) The average bit rate allocated for application data flow of the packet (Average $BitRate_{dataflow}$).
ii) The queuing delay of head of the line of application data flow of the packet ($\tau_{HOL\text{-}dataflow}$).
iii) Inter-scheduling interval of the application data flow of the packet (InterSchedulingInterval$_{dataflow}$)
For packet i, the equation to determine the scheduling metric $\omega_i$ is, $$\omega_i = 1 + \log\left(\frac{MaxGBR_{QCI}}{Average\ BitRate_{dataflow}} * \left(\exp\left(\frac{\tau_{HOL-dataflow}}{\lambda_{QCI}}\right)\right)^{InterSchedulingInterval_{dataflow}}\right)$$

a. The SMCM then stores the calculated scheduling metric in the Scheduling metric field of the packet.

At step 510, the PSM 148 may then get the scheduling metric for each packet from the scheduling metric field of the packet. The bin may be sorted in descending order of the calculated scheduling metric. Thereafter, at step 512, the PSM 148 may fetch the packet transmitted per Bin associated with GBR-NewTx bin i.e. $\chi_{MAX}$ from the SCM 152 and added to scheduling list $\mu_{LIST}$.

Figure 6:
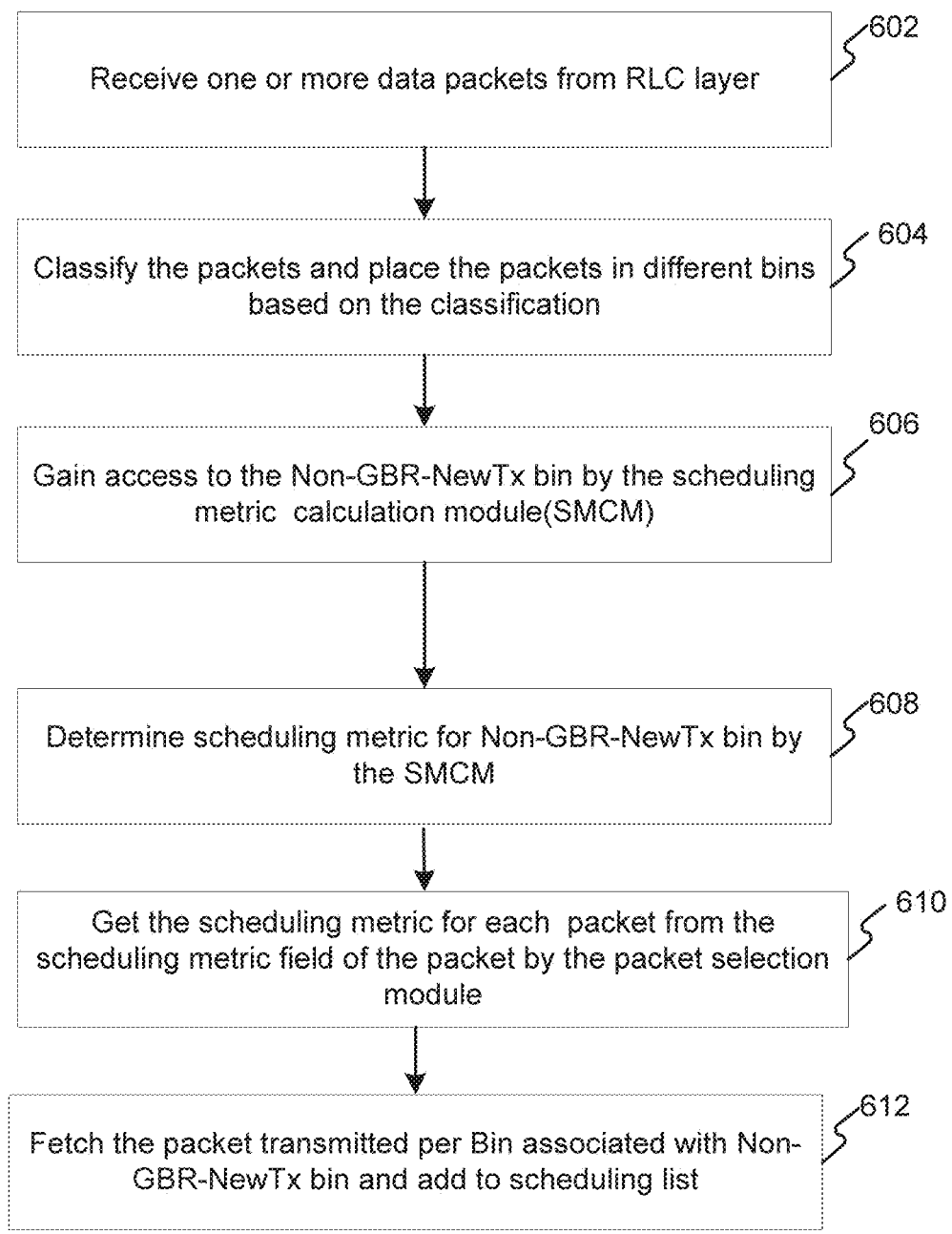
FIG. 6 is a flowchart of an exemplary method of scheduling of the downlink packets obtained from Non-GBR-NewTx bin in accordance with some embodiments of the present disclosure.

FIG. 6 is a flowchart 600 of an exemplary method of scheduling of the downlink packets obtained from the Non-GBR-NewTx bin 151. At step 602, receive one or more data packets. The PCM 142 may receive the one or more data packets form the RLC layer 130 either through a communication interface or in-memory data sharing.

At step 604, classify the packets and place the packets in different bins based on the classification. The PCM 142 may identify the transmission type of the received packet, as one of Control packet, GBR Packet, Non-GBR packet, etc. based on the radio-bearer-id in the received packet. The PCM 142 may then identify the radio transmission state of the packet, as one of New Transmission packet, Re-Transmission packet, etc. from the HARQ (Hybrid Automatic Repeat Request) state of the packet. For example, if transmission type is Non-GBR Packet and radio transmission state is New Transmission packet then the label will be 'Non-GBR-NewTx'. The PCM 142 may assign the generated label to the received packets to classify it by setting the value of the field 'Label' in the packet. The PCM 142 may forward the labeled packet to the BMM 144 either through an interface or in-memory data sharing. The BMM 144 may receive the labeled-packet and stores packet-arrival-time as the current system time-stamp and set the bin-onset-time value to zero to the labeled packet. The BMM 144 may then place the labeled packet in the respective bin by matching the Bin ID with the packet label.

At step 606, the SMCM 146 may gain access to the Non-GBR-NewTx bin 151 from the BMM 144. At step 608, the SMCM 146 may then determine scheduling metric for Non-GBR-NewTx bin 151 using the following steps for the bin.

If Non-GBR-NewTx Bin?

a. The SMCM 146 may check if the scheduling metric calculation periodicity for this bin is reached, i.e., if System–time % $\alpha_{GN-bin}$==0

If true then SMCM 146 goes to the next step else it returns, wherein system-time is the current system time stamp obtained from MAC's L2-L1 interface 140.

b. The SMCM 146 may then calculate the scheduling metric for all the packets in the bin, in top to bottom order, using the following steps, 1) The SMCM 146 may determine the QCI of the packet from the QCI field of the packet.

2) The SMCM 146 may obtain the values of $\lambda_{QCI}$ for the determined QCI from the SCM 152.

3) The SMCM 146 then gets the following values from the PMM 150, a. Available bit rate for application data flow of the packet (AvailableBitrate$_{dataflow}$)

b. The average bit rate allocated for application data flow of the packet (Average BitRate$_{dataflow}$)

c. The queuing delay of head of the line of application data flow of the packet ($\tau_{HOL-dataflow}$)

For each packet i, the equation to determine the scheduling metric $\omega_i$ is, $$\omega_i = 1 + \log\left(\frac{AvailableBitrate_{dataflow}}{Average\ BitRate_{dataflow}} * \left(\exp\left(\frac{\tau_{HOL-dataflow}}{\lambda_{QCI}}\right)\right)\right)$$

The SMCM 146 may then store the calculated scheduling metric in the Scheduling metric field of the packet.

The SMCM 146 may then store the calculated scheduling metric in the scheduling metric field of the packet.

At step 610, the PSM 148 may then get the scheduling metric for each packet from the scheduling metric field of the packet. The bin may be sorted in ascending/descending order of the calculated scheduling metric. Thereafter, at step 612, the PSM 148 may fetch the packet transmitted per bin associated with Non-GBR-NewTx bin i.e. $\chi_{MAX}$ from the SCM 152 and added to scheduling list $\mu_{LIST}$.

FIG. 7 is a flowchart 700 of an exemplary method of scheduling of the downlink packets obtained from the control-NewTx 143 and control-ReTx bins 141. At step 702, receive one or more data packets. The PCM 142 may receive the one or more data packets form the RLC layer 130 either through a communication interface or in-memory data sharing.

At step 704, classify the packets and place the packets in different bins based on the classification. At step 706, the PSM 148 may fetch the packets from the control-NewTx 143 and the control-ReTx bins 141 as per the Packet Transmitted per Bin $\phi_{MAX}$ or $\omega_{MAX}$ obtained from the SCM 152. Then the packets are added to the scheduling list $\mu_{LIST}$.

Figure 8:
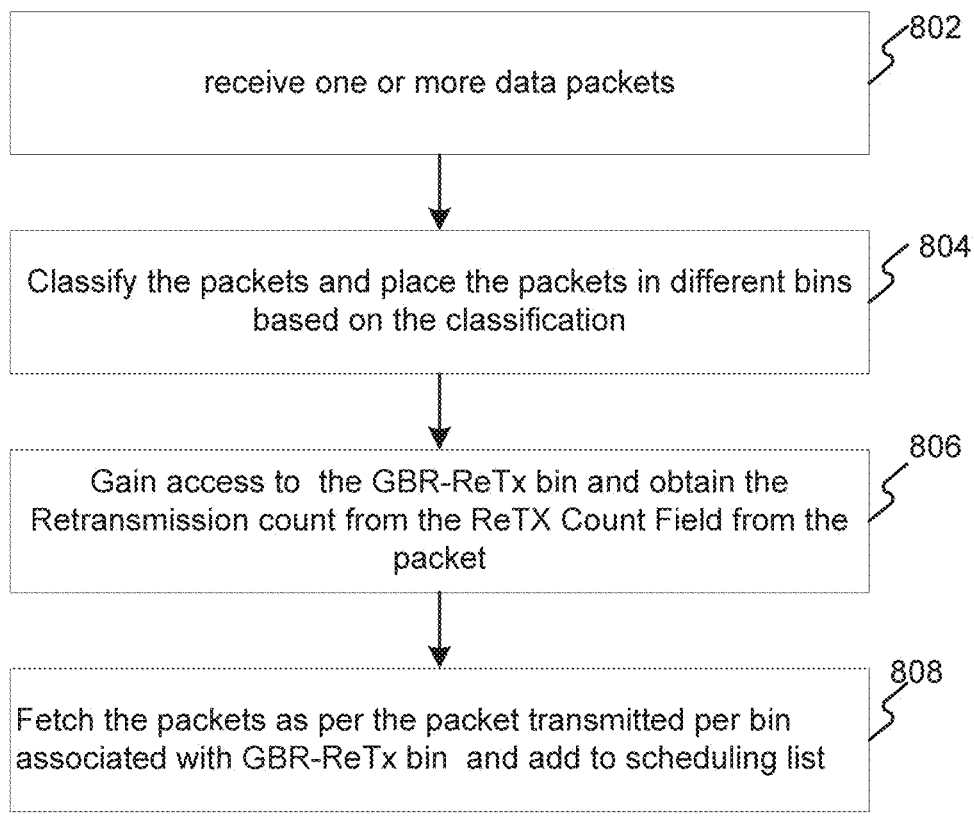
FIG. 8 is a flowchart of an exemplary method of scheduling of the downlink packets obtained from the GBR-ReTx bin in accordance with some embodiments of the present disclosure.

FIG. 8 is a flowchart 800 of an exemplary method of scheduling of the downlink packets obtained from the GBR-ReTx bin 145. At step 802, receive one or more data packets. The PCM 142 may receive the one or more data packets form the RLC layer 130 either through a communication interface or in-memory data sharing.

At step 804, classify the packets and place the packets in different bins based on the classification. At step 806, the PSM 148 may gain access to the GBR-ReTx bin 145. The PSM 148 may obtain the Retransmission count from the ReTX Count Field from the packet. Packets Retransmission count greater than GBR-ReTx Max Retx count $\gamma_{GR-MaxReTx}$ may be dropped. The PSM 148 may then choose the packets with Bin-onset-time greater than GBR-ReTx Bin hold off timer threshold ($\beta_{GR-HOT-th}$) and adds to a temporary list. The temporary list may be sorted in with respect to retransmission count in descending order.

At step 808, the PSM 148 may fetch the packets as per the packet transmitted per bin associated with GBR-ReTx bin (i.e. $\phi_{MAX}$) from the SCM 152 and added to scheduling list $\mu_{LIST}$.

Figure 9:
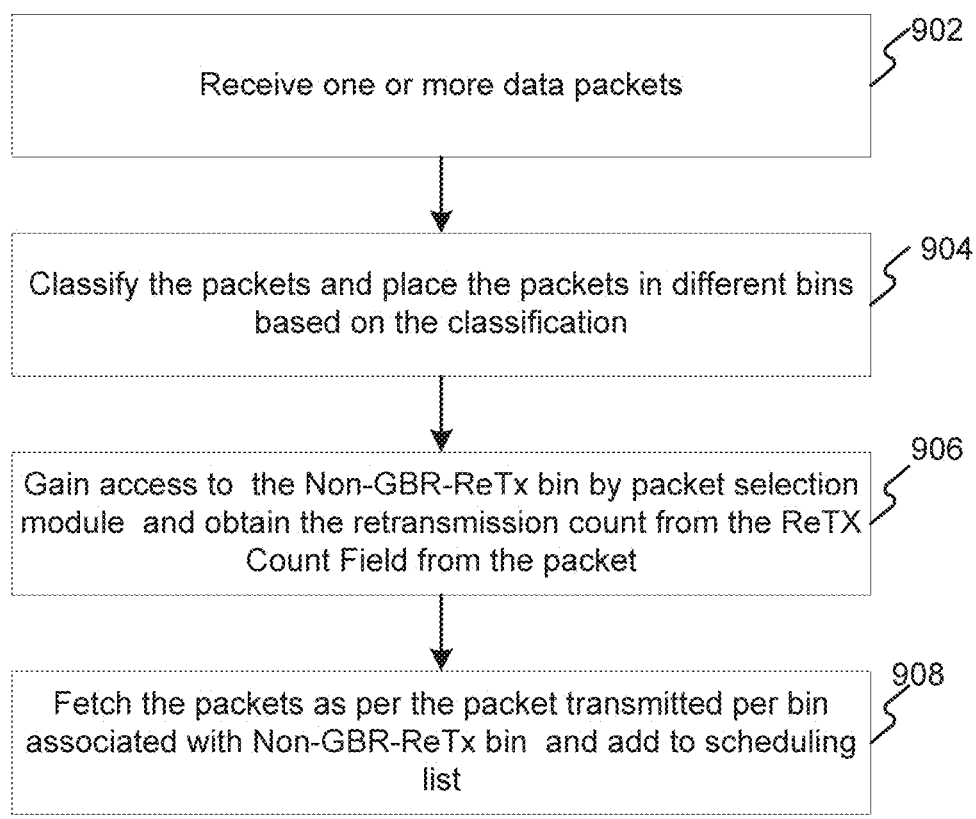
FIG. 9 is a flowchart of an exemplary method of scheduling of the downlink packets obtained from the Non-GBR-ReTx bin in accordance with some embodiments of the present disclosure.

FIG. 9 is a flowchart 900 of an exemplary method of scheduling of the downlink packets obtained from the Non-GBR-ReTx bin 149. At step 902, receive one or more data packets. The PCM 142 may receive the one or more data packets form the RLC layer 130 either through a communication interface or in-memory data sharing.

At step 904, classify the packets and place the packets in different bins based on the classification. At step 906, the PSM 148 may gain access to the Non-GBR-ReTx bin 145. The PSM 148 may obtain the Retransmission count from the ReTX Count Field from the packet. Packets Retransmission count greater than NonGBR-ReTx Max Retx count $\gamma_{NGR-MaxReTx}$ may be dropped. The PSM 148 may then choose the packets with Bin-onset-time greater than Non-GBR-ReTx Bin hold off timer threshold ($\beta_{NGR-HOT-th}$) and adds to a temporary list. The temporary list may be sorted in with respect to Retransmission count in descending order.

At step 908, the PSM 148 may fetch the packets as per the packet transmitted per bin associated with Non-GBR-ReTx i.e. $\phi_{MAX}$ from the SCM 152 and added to the scheduling list $\mu_{LIST}$.

Figure 10:
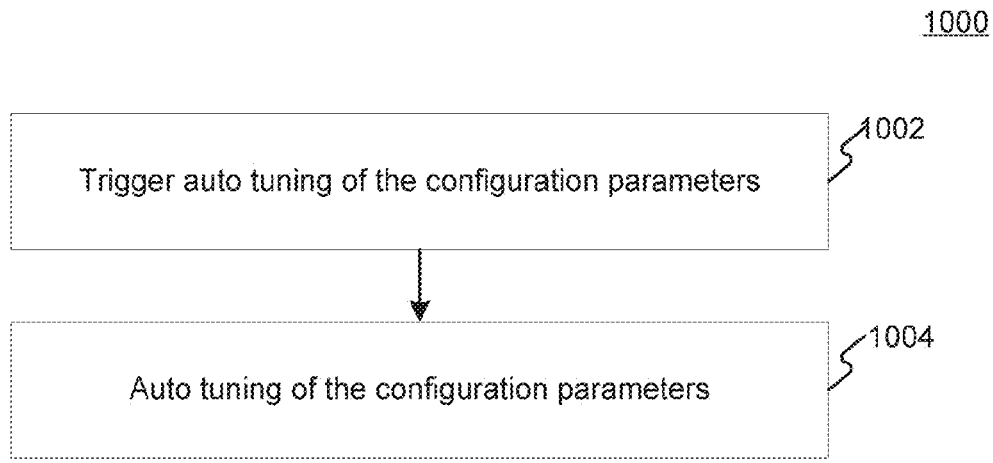
FIG. 10 is a flowchart of an exemplary method for auto tuning of the configuration parameters stored in schedule configuration module in accordance with some embodiment of the present disclosure.

FIG. 10 is a flowchart 1000 of an exemplary method for auto tuning of the configuration parameters stored in the SCM 152 in accordance with some embodiment of the present disclosure. At step 1002, trigger auto tuning of the configuration parameters. The TAM 154 may obtain the auto tuning periodicity $T_{Auto-tuning}$ from the SCM 152. The TAM 154 may obtain the system time and check whether the occurrence of the auto-tuning trigger interval is reached or not, i.e., if System-Time % $T_{Auto-tuning}$==0

At step 1004, actual auto tuning of the configuration parameters take place. The ATM 156 may read the current scheduler configuration parameters (for example Packet Transmitted per Bin, Priority order) from the SCM 152. For packet transmitted per bin parameter update, the ATM 156 may perform the following steps:

The ATM 156 may check whether the average inter scheduling delay is greater than or equal to average-inter-scheduling-delay-Threshold-per-Bin [ ($\Omega$) _(bin-TH)) AND current number of queued packet per bin is greater than or equal to Number of Packet Queued Threshold per Bin (N_(bin-TH))

For those bins, if the above comparison is TRUE, then increment the packet transmitted per Bin by Δ_bin, ELSE for those bins, if the above comparison is FALSE, then decrement the packet transmitted per Bin by Δ_bin. The ATM 156 may send the new packet transmitted per Bin to the SCM 152.

For Priority order parameter update, the ATM 156 may check whether the current number of queued packet per bin is greater than Number of Packet Queued Threshold per Bin [ (N] _(bin-TH)). If TRUE, ATM will alter given priority ELSE maintain the current priority order. The ATM 156 may re order the priority order and send it to the SCM 152.

Exemplary Computer System

Figure 11:
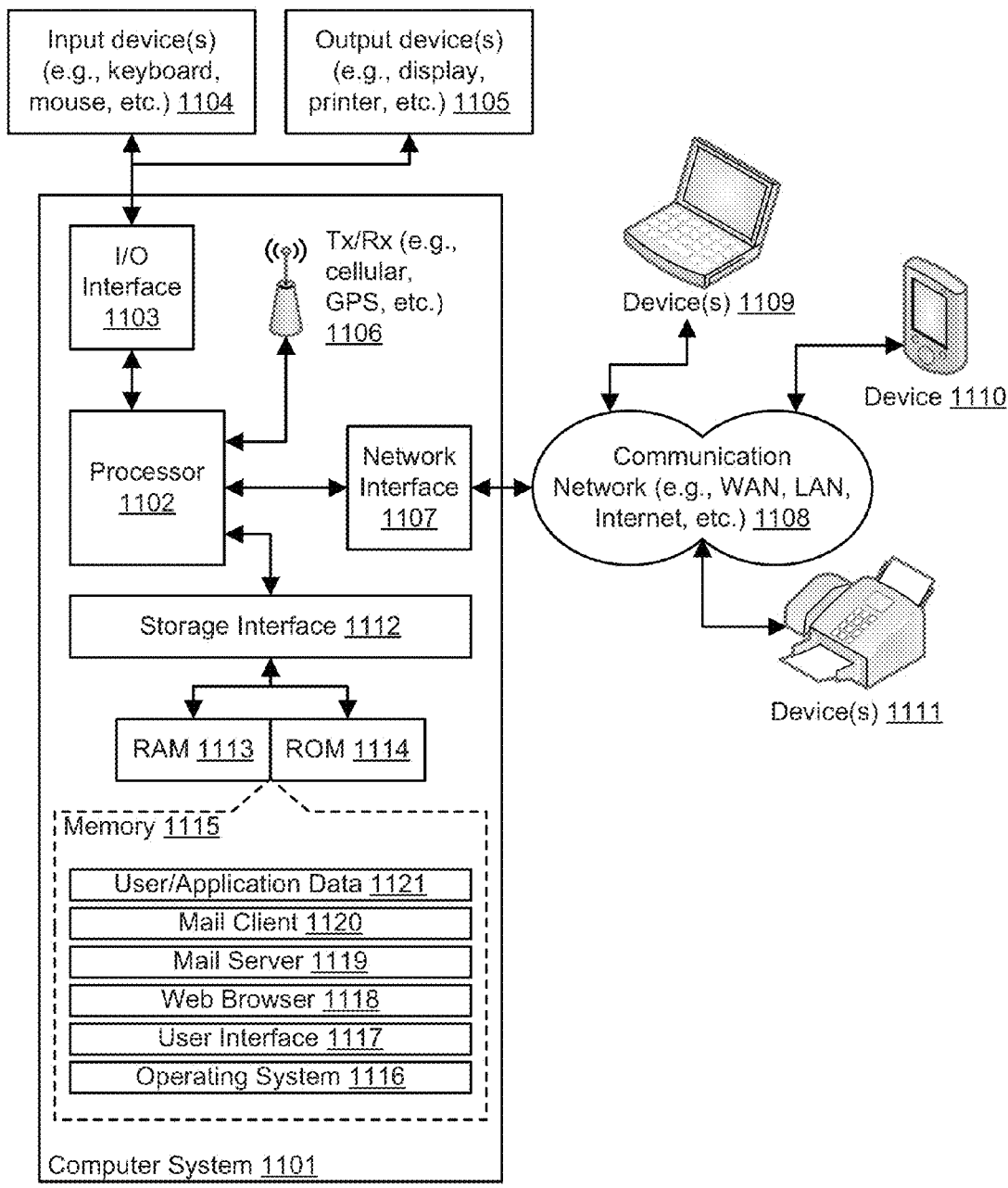
FIG. 11 is a block diagram of an exemplary computer system for implementing embodiments consistent with the present disclosure.

FIG. 11 is a block diagram of an exemplary computer system 1101 for implementing embodiments consistent with the present disclosure. Variations of computer system 1101 may be used for implementing any of the devices and/or device components presented in this disclosure. Computer system 1101 may comprise a central processing unit (CPU or processor) 1102. Processor 1102 may comprise at least one data processor for executing program components for executing user- or system-generated requests. A user may include a person using a device such as such as those included in this disclosure or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1102 may be disposed in communication with one or more input/output (I/O) devices via I/O interface 1103. The I/O interface 1103 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1103, the computer system 1101 may communicate with one or more I/O devices. For example, the input device 1104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1105 may be a printer, fax machine, video display (e.g., cathode ray tube (CRT), liquid crystal display (LCD), light-emitting diode (LED), plasma, or the like), audio speaker, etc. In some embodiments, a transceiver 1106 may be disposed in connection with the processor 1102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1108 via a network interface 1107. The network interface 1107 may communicate with the communication network 1108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (e.g., using Wireless Application Protocol), the Internet, etc. Using the network interface 1107 and the communication network 1108, the computer system 1101 may communicate with devices 1109. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1101 may itself embody one or more of these devices.

In some embodiments, the processor 1102 may be disposed in communication with one or more memory devices (e.g., RAM 1113, ROM 1114, etc.) via a storage interface 1112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1116, user interface application 1117, web browser 1118, mail server 1119, mail client 1120, user/application data 1121. The operating system 1116 may facilitate resource management and operation of the computer system 1101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1117 may facilitate display, execution, interaction, manipulation, or operation of program components through textual or graphical facilities. For example, user interfaces may provide computer interaction interface elements on a display system operatively connected to the computer system 1101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1101 may implement a web browser 1118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1101 may implement a mail server 1119 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1101 may implement a mail client 1120 stored program component. The mail client may be a mail viewing application, such as Apple Mail, Microsoft Entourage, Microsoft Outlook, Mozilla Thunderbird, etc.

In some embodiments, computer system 1101 may store user/application data 1121, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for efficient scheduling of downlink data traffic at a base station, the method comprising:
   receiving, at a first protocol layer, one or more downlink data packets from a second protocol layer;
   classifying the one or more downlink packets into one or more categories of packets based on transmission type and radio transmission state of the one or more downlink packets;
   scheduling one or more first packets from each of the one or more categories of packets based on a pre-determined priority order of the one or more categories of packets and a predetermined packet transmission share associated with each of the one or more categories of packets;
   transmitting the one or more first packets from the one or more categories of packets in a transmission time interval; and
   updating a pre-determined priority order of the one or more categories of packets and a pre-determined packet transmission share associated with each of the one or more categories of packets after a predetermined time interval; and
   scheduling one or more second packets from the one or more categories of packets based on the updated pre-determined priority order of the one or more categories of packets and a predetermined packet transmission share associated with each of the one or more categories of packets in the transmission time interval subsequent to the updating.

2. The method of claim 1, wherein classifying the one or more downlink packets into one or more categories of packets based on the one or more parameters comprises:
classifying the one or more downlink packets into categories of control-new transmission packets, control retransmission packets, guaranteed bit rate (GBR)-new transmission packets, GBR-retransmission packets, non GBR-new transmission packets, and on GBR-retransmission packets.

3. The method of claim 1, wherein scheduling the one or more first packets from each of the one or categories of packets comprises:
calculating scheduling metric for each of the guaranteed bit rate (GBR)-new transmission packets, non GBR-new transmission packets based on one or more performance parameters associated with the guaranteed bit rate (GBR)-new transmission packets, non GBR-new transmission packets transmitted in previous transmission time interval;
sorting each of the guaranteed bit rate (GBR)-new transmission packets, GBR-retransmission packets in decreasing/increasing order based on the scheduling metric; and
fetching guaranteed bit rate (GBR)-new transmission packets, non GBR-new transmission packets based on maximum number of guaranteed bit rate (GBR)-new transmission packets, non GBR-new transmission packets set to be transmitted in the transmission time interval.

4. The method of claim 3, wherein the one or more performance parameters comprise at least one of an average bit rate, available bit rate, queuing delay, or interval scheduling interval associated with the guaranteed bit rate (GBR)-new transmission packets, the non GBR-new transmission packets.

5. The method of claim 1, wherein scheduling the one or more first packets from each of the one or more categories of packets comprises:
fetching the control-new transmission packets, control retransmission packets based on maximum number of control-new transmission packets, control retransmission packets set to be transmitted in the transmission time interval.

6. The method of claim 5, wherein scheduling the one or more first packets from each of the one or more categories of packets comprises:
fetching the GBR-retransmission packets, non GBR-retransmission packets set to be transmitted in the transmission time interval if predetermined onset time for triggering transmission of GBR-retransmission packets, non GBR-retransmission packets is greater than maximum hold off time of GBR-retransmission packets, non GBR-retransmission packets.

7. The method of claim 6, wherein scheduling the one or more first packets from each of the one or more categories of packets comprises:
discarding the GBR-retransmission packets, non GBR-retransmission packets set to be transmitted in the transmission time interval if transmission count of the GBR-retransmission packets, non GBR-retransmission packets is greater than maximum retransmission count.

8. The method of claim 1, wherein updating the pre-determined priority order of the one or more categories of packets comprises:
determining, for each of the one or more categories of packets, whether number of packets queued per category of packets is greater than number of packets queued threshold per category of packets; and
altering the pre-determined priority order of the one or more categories of packets based on the determining.

9. The method of claim 1, wherein updating the pre-determined packet transmission share associated with each of the one or more categories of packets comprises:
determining, for each of the one or more categories of packets, whether average inter scheduling delay for one or more categories of packets is greater than or equal to average inter scheduling delay threshold per category of packets;
checking, for each of the one or more categories of packets, whether number of packets queued per category of packets is greater than number of packets queued threshold per category of packets;
altering the pre-determined packet transmission share associated with each of the one or more categories of packets based on the determining and the checking.

10. A system for efficient scheduling of downlink data traffic at a base station, the system comprising:
one or more hardware processors; and
a memory storing instructions that, when executed by the one or more hardware processors, cause the one or more hardware processors to perform operations comprising:
receiving, at a first protocol layer, one or more downlink data packets from a second protocol layer;
classifying the one or more downlink packets into one or more categories of packets based on transmission type and radio transmission state of the one or more downlink packets;
scheduling one or more first packets from each of the one or more categories of packets based on a pre-determined priority order of the one or more categories of packets and a predetermined packet transmission share associated with each of the one or more categories of packets;
transmitting the one or more first packets from the one or more categories of packets in a transmission time interval;
updating a pre-determined priority order of the one or more categories of packets and a pre-determined packet transmission share associated with each of the one or more categories of packets after a predetermined time interval; and
scheduling one or more second packets from the one or more categories of packets based on the updated pre-determined priority order of the one or more categories of packets and a predetermined packet transmission share associated with each of the one or more categories of packets in the transmission time interval subsequent to the updating.

11. The system of claim 10, wherein classifying the one or more downlink packets into one or more categories of packets based on the one or more first parameters comprises:
classifying the one or more downlink packets into categories of control-new transmission packets, control retransmission packets, guaranteed bit rate (GBR)-new transmission packets, GBR-retransmission packets, non GBR-new transmission packets, and on GBR-retransmission packets.

12. The system of claim 11, wherein scheduling the one or more first packets from each of the one or more categories of packets comprises:
fetching the control-new transmission packets, control retransmission packets based on maximum number of control-new transmission packets, control retransmission packets set to be transmitted in the transmission time interval.

13. The system of claim 12, wherein scheduling the one or more first packets from each of the one or more categories of packets comprises:
fetching the GBR-retransmission packets, non GBR-retransmission packets set to be transmitted in the transmission time interval if predetermined onset time for triggering transmission of GBR-retransmission packets, non GBR-retransmission packets is greater than maximum hold off time of GBR-retransmission packets, non GBR-retransmission packets.

14. The system of claim 13, wherein scheduling the one or more first packets from each of the one or more categories of packets comprises:
discarding the GBR-retransmission packets, non GBR-retransmission packets set to be transmitted in the transmission time interval if transmission count of the GBR-retransmission packets, non GBR-retransmission packets is greater than maximum retransmission count.

15. The system of claim 10, wherein scheduling the one or more first packets from each of the one or categories of packets comprises:
calculating scheduling metric for each of the guaranteed bit rate (GBR)-new transmission packets, non GBR-new transmission packets based on one or more performance parameters associated with the guaranteed bit rate (GBR)-new transmission packets and the non GBR-new transmission packets transmitted in previous transmission time interval;
sorting each of the guaranteed bit rate (GBR)-new transmission packets, GBR-retransmission packets in decreasing/increasing order based on the scheduling metric; and
fetching guaranteed bit rate (GBR)-new transmission packets, non GBR-new transmission packets based on maximum number of guaranteed bit rate (GBR)-new transmission packets, non GBR-new transmission packets set to be transmitted in the transmission time interval.

16. The system of claim 15, wherein the one or more performance parameters comprise at least one of an average bit rate, an available bit rate, queuing delay, or an interval scheduling interval associated with the guaranteed bit rate (GBR)-new transmission packets, the non GBR-new transmission packets.

17. The system of claim 10, wherein updating the pre-determined priority order of the one or more categories of packets comprises:
determining, for each of the one or more categories of packets, whether number of packets queued per category of packets is greater than number of packets queued threshold per category of packets; and
altering the pre-determined priority order of the one or more categories of packets based on the determining.

18. The system of claim 10, wherein updating the pre-determined packet transmission share associated with each of the one or more categories of packets comprises:
determining, for each of the one or more categories of packets, whether average inter scheduling delay for one or more categories of packets is greater than or equal to average inter scheduling delay threshold per category of packets;
checking, for each of the one or more categories of packets, whether number of packets queued per category of packets is greater than number of packets queued threshold per category of packets; and
altering the pre-determined packet transmission share associated with each of the one or more categories of packets based on the determining and the checking.

19. A non-transitory computer readable medium storing instructions for efficient scheduling of downlink data traffic at a base station that, when executed by a processor cause the processor to perform operations comprising:
receiving, at a first protocol layer, one or more downlink data packets from a second protocol layer;
classifying the one or more downlink packets into one or more categories of packets based on transmission type and radio transmission state of the one or more downlink packets;
scheduling one or more first packets from each of the one or more categories of packets based on a pre-determined priority order of the one or more categories of packets and a predetermined packet transmission share associated with each of the one or more categories of packets;
transmitting the one or more first packets from the one or more categories of packets in a transmission time interval;
updating a pre-determined priority order of the one or more categories of packets and a pre-determined packet transmission share associated with each of the one or more categories of packets after a predetermined time interval; and
scheduling one or more second packets from the one or more categories of packets based on the updated pre-determined priority order of the one or more categories of packets and a predetermined packet transmission share associated with each of the one or more categories of packets in the transmission time interval subsequent to the updating.

* * * * *